US012576724B2

(12) United States Patent     (10) Patent No.:    US 12,576,724 B2
    Takahashi et al.                (45) Date of Patent:        Mar. 17, 2026

---

(54) ELECTRIC POWER EQUIPMENT

(71) Applicant: Honda Motor Co., Ltd., Tokyo (JP)

(72) Inventors: Hiroya Takahashi, Saitama (JP); Toru Yuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 411 days.

(21) Appl. No.: 17/537,508

(22) Filed: Nov. 30, 2021

(65) Prior Publication Data

US 2023/0166603 A1     Jun. 1, 2023

(51) Int. Cl.
    *B60L 15/20*     (2006.01)
    *A01D 69/02*     (2006.01)
    *A01D 69/08*     (2006.01)
    *B60K 17/02*     (2006.01)
    *F16D 43/04*     (2006.01)
    *A01D 101/00*    (2006.01)

(52) U.S. Cl.
    CPC .............. *B60L 15/20* (2013.01); *A01D 69/02*
    (2013.01); *A01D 69/08* (2013.01); *B60K 17/02*
    (2013.01); *F16D 43/04* (2013.01); *A01D*
    *2101/00* (2013.01); *B60L 2200/40* (2013.01);
    *B60L 2240/421* (2013.01); *B60L 2240/507*
    (2013.01)

(58) Field of Classification Search
    CPC ................ B60L 15/20; B60L 2200/40; B60L
    2240/421; B60L 2240/507; B60L 1/003;
    A01D 69/02; A01D 69/08; A01D
    2101/00; A01D 34/6812; A01D 34/78;
    B60K 17/02; F16D 43/04
    USPC ................... 56/10.2, 10.2 A, 10.2 G, 10.2 R;
    477/108; 701/22, 54, 67, 70
    See application file for complete search history.

(56) References Cited

U.S. PATENT DOCUMENTS

| | | | |
|---|---|---|---|
| 5,662,553 A | 9/1997 | Reichlinger | |
| 7,669,702 B2 | 3/2010 | Blanchard | |
| 2006/0175098 A1* | 8/2006 | Sutherland | ............. B62D 11/24 |
| | | | 180/6.24 |
| 2010/0005768 A1 | 1/2010 | Silbernagel | |

(Continued)

FOREIGN PATENT DOCUMENTS

| | | | | |
|---|---|---|---|---|
| EP | 4140278 A1 * | 3/2023 | ............. | A01D 69/08 |
| GB | 2562939 A * | 11/2018 | ............. | H04W 4/24 |

(Continued)

OTHER PUBLICATIONS

"Office Action of Germany Counterpart Application", issued on Dec. 3, 2024, with English translation thereof, p. 1-p. 8.

*Primary Examiner* — Angela Y Ortiz
*Assistant Examiner* — Aaron K McCullers
(74) *Attorney, Agent, or Firm* — JCIPRNET

(57) ABSTRACT

An electric power equipment includes a drive source, a clutch provided in a power transmission path between the drive source and the travel unit and a controller for controlling an operation of the drive source. Wherein the controller is configured that in a process of increasing a speed in accordance with a rotational speed command value, when a rotational speed of the drive source reaches the clutch connection rotational speed, the increasing of the speed in accordance with the rotational speed command value is interrupted, and when the rotational speed of the drive source reaches a predetermined rotational speed, the increasing of the speed in accordance with the rotational speed command value is performed.

5 Claims, 6 Drawing Sheets

(56) References Cited

U.S. PATENT DOCUMENTS

| 2012/0159916 A1* | 6/2012 | Ishii ........................ B60L 58/40 |
| | | 56/10.2 G |
| 2016/0009286 A1* | 1/2016 | Kobayashi .............. F16H 29/04 |
| | | 477/115 |
| 2018/0118035 A1* | 5/2018 | Ozawa ................ B60L 15/2009 |
| 2018/0146616 A1 | 5/2018 | Fukano et al. |
| 2020/0390028 A1 | 12/2020 | Kuriyagawa |
| 2020/0406885 A1 | 12/2020 | Kuriyagawa et al. |
| 2021/0221022 A1 | 7/2021 | Haas et al. |
| 2022/0117155 A1* | 4/2022 | Kippes ............... A01D 34/6812 |
| 2023/0391408 A1* | 12/2023 | Hirase ............... H05K 7/20927 |
| 2024/0271669 A1* | 8/2024 | Maringer ............. F16D 48/064 |

FOREIGN PATENT DOCUMENTS

| JP | H09201126 | 8/1997 |
| JP | 2009296933 | 12/2009 |
| JP | 2010053925 | 3/2010 |
| JP | 5491346 | 5/2014 |
| JP | 2016156223 | 9/2016 |
| JP | 6230642 | 11/2017 |
| JP | 6672128 | 3/2020 |
| JP | 6852696 | 3/2021 |

* cited by examiner

ELECTRIC POWER EQUIPMENT

BACKGROUND OF THE DISCLOSURE

Technical Field

The disclosure relates to an electric power equipment.

Related Art

Various kinds of electric power equipment including wheels for propelling the electric power equipment and a work unit for performing a prescribed work are known in such forms as lawn mowers, snow blowers and tillers. See JP H09-201126 A, JP 2016-156223 A and JP 2009-296933 A, for instance. Such electric power equipment is typically provided with wheels to propel the equipment, and the work unit performs the prescribed work as the equipment travels forward. The work unit may cut the grass, remove the snow or till the soil depending on the particular application.

In such electric power equipment, the rotational speed of the motor (work motor) for the work unit is usually maintained at a constant value so that an optimum result may be obtained for the given power of the work motor that drives the work unit. The load of the work unit may vary for each particular area that is being worked. For instance, in the case of a lawn more, the grass may be taller and/or more dense in some part of the lawn than in other parts. When the load changes, the rotational speed of the rotary blade changes. If the blade rotational speed is excessively low, the grass may be torn or ripped, and this causes an uneven unattractive finish.

Also in an electric power equipment, for example a lawn mower, disclosed in US 2018/0146616 A1, a travel motor for driving the travel unit and a control unit for controlling operation of the work motor and the travel motor is equipped in the electric power equipment, in which the control unit is configured to maintain a rotational speed of the work motor at a constant value. The control unit is further configured to decrease a rotational speed of the travel motor in response to an increase in a load applied to the work motor. By reducing the rotational speed of the travel motor, the amount of work that is required to be performed per unit time by the work motor is reduced, and the increase in the load on the work motor is thereby suppressed.

Moreover, a dog clutch having the advantage of being compact and simple in structure described in U.S. Pat. No. 7,669,702 B2 discloses the use of a pair of dog clutches to accommodate the difference in the rotational speed between the two rear wheels during the cornering of the mower.

However, in various lawn mowers mentioned above, with respect to a traveling lawn mower having a one-way clutch equipped between the motor and the driven wheel, in which the one-way clutch is used for engagement and disengagement with the motor so as to perform speed adjustment functions in response to a sudden acceleration or a sudden deceleration command value, there is a problem that in a case after the clutch is engaged, since a sudden load is applied to the motor, so that the rotational speed of the motor decreases, increasing of a deviation value between a value of the rotational speed of the travel motor and a value of the command value may occur, and the increase of the deviation value may induce the travel motor to travel in a sudden acceleration with respect to the rotational speed so as to match the rotational speed with the command value. Due to such sudden acceleration that the travel motor accelerates rapidly so as to comply with the command value, the lawn mower may be operated in an uncomfortable manner such as the operability of the lawn mower may be deteriorated, the front wheels of the lawn mower may be lifted, and the like.

SUMMARY

According to an exemplary embodiment of the disclosure, an electric power equipment, such as a traveling lawn mower is provided. The electric power equipment includes a work unit for performing a prescribed work; a travel unit for enabling the electric power equipment to travel on a ground surface; a drive source for driving the travel unit; a clutch provided in a power transmission path between the drive source and the travel unit for switching between a transmission and a discontinuation of a power transmission from the drive source to the travel unit, wherein the clutch is configured that the clutch is turned on when a rotational speed of the power transmission path between the drive source and the travel unit reaches a clutch connection rotational speed of the clutch; and a controller for controlling an operation of the drive source. Wherein the controller is configured that in a process of increasing a speed in accordance with a rotational speed command value, when a rotational speed of the drive source reaches the clutch connection rotational speed, the increasing of the speed in accordance with the rotational speed command value is interrupted, and when the rotational speed of the drive source reaches a predetermined rotational speed, the increasing of the speed in accordance with the rotational speed command value is performed.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

In the following drawings, in order to make each configuration easy to understand, the scale, the number and the like may be different in each structure and the actual structures. An exemplary embodiment of an electric power equipment of the disclosure is described below with reference to the drawings. The electric power equipment is implemented as a lawn mower. In addition, the electric power equipment may include, not exclusively, walk behind lawn mowers, grass trimmer, snow blowers and tillers.

<Overall Configuration of Electric Power Equipment>

Figure 1:
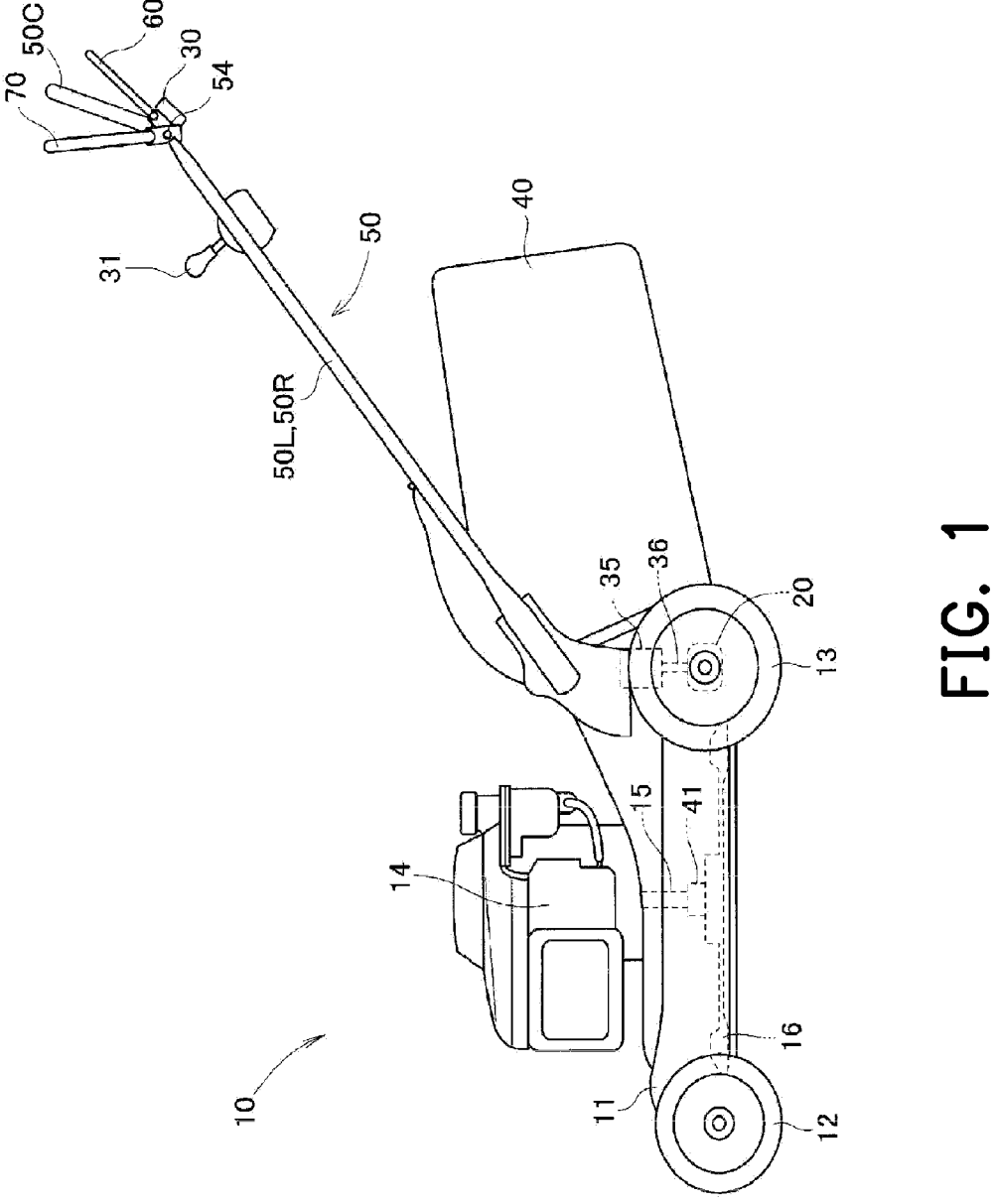
FIG. 1 is a schematic view shown a left side of an electric power equipment according to an exemplary embodiment of the disclosure.

FIG. 1 is a schematic view shown a left side of an electric power equipment according to an exemplary embodiment of the disclosure. According to an exemplary embodiment of the disclosure, as shown in FIG. 1 which is a side view of an electric power equipment 10, for example, a mower 10 (for example, a walk behind lawn mower), the mower 10 of the illustrated embodiment includes a body frame 11, a pair of front wheels 12 positioned on either side of a front part of the body frame 11, and a pair of rear wheels 13 positioned on either side of a rear part of the body frame 11. While the front wheels 12 are free rolling wheels, the rear wheels 13 are powered or are driven wheels as will be described hereinafter.

The electric power equipment 10 is equipped with a work unit for performing a prescribed work, such as mowing on a ground surface, and a travel unit for enabling the electric power equipment to travel on a ground surface. The work unit includes an engine 14 consisting of a vertical internal combustion engine (having a vertically extending crankshaft or an output shaft 15) mounted on top of the body frame 11, and a cutter blade 16 is positioned centrally under the body frame 11 and the cutter blade 16 is powered directly by the engine 14. More specifically, the output shaft 15 of the engine 14 is connected to the cutter blade 16, and is provided with a flywheel brake 41. The engine 14 may include an alternator (a power generation unit) connected to the output shaft 15 for converting the power of the engine 14 to an electric power, so that the electric power may be supplied to the electric motor 35 described hereinafter.

The travel unit of the mower 10 includes a drive source (hereinafter, an electric motor 35) fixedly attached to the body frame 11 and having a downwardly extending drive shaft 36, and a power transmission system 20 provided between the drive shaft 36 and the rear wheels 13. The rear wheels 13 are thus driven by the electric motor 35.

The mower 10 is further provided with a handle bar 50 having a pair of side rod members 50L and 50R extending obliquely rearwardly from a rear end of the body frame 11 and a cross member 50C extending laterally between the rear ends of the side rod members 50L and 50R. A flywheel brake lever 60 and a drive lever 70, each consisting of a half loop member, are pivotally attached to upper parts of the side rod members 50L and 50R at respective ends. An operation switch 30 is provided on a pivot shaft 54 for the drive lever 70 for manually turning on and off the electric motor 35 by the pivoting of the drive lever 70. An engine throttle/choke lever 31 is attached to an intermediate part of the left side rod member 50L, and is connected to the corresponding part of the carburetor of the engine 14 via a cable although not shown in the drawings.

The flywheel brake lever 60 is connected to the flywheel brake 41 such that the flywheel brake 41 is released (and the ignition circuit not shown in the drawings is closed at the same time) when the flywheel brake lever 60 is held against the cross member 50C. When the flywheel brake lever 60 is released, and pivoted away from the cross member 50C, a brake is applied to the engine 14, and the ignition circuit opens.

When the drive lever 70 is released, and pivoted away from the cross member 50C, the supply of electric power to the electric motor 35 is discontinued, and the rear wheels 13 receive no power from the electric motor 35. When the drive lever 70 is held against the cross member 50C, the supply of electric power to the electric motor 35 is resumed so that the mower 10 is propelled forward under the power of the electric motor 35. Herein, the electric motor 35 may be electrically connected to the alternator of the engine 14 for receiving the electric power supplied from the engine 14. Alternatively, the mower 10 may include a battery fixed to the body frame 11 so that the electric motor 35 may receive the electric power supplied from the battery.

When starting the engine 14, only the flywheel brake lever 60 is held against the cross member 50C. Once the engine 14 has started, the operator additionally holds the drive lever 70 against the cross member 50C, and the mower 10 is propelled forward so that the lawn mowing can be initiated. The grass clippings cut by the cutter blade 16 are blown into a grass bag 40 attached to the rear end of the body frame 11.

Figure 2:
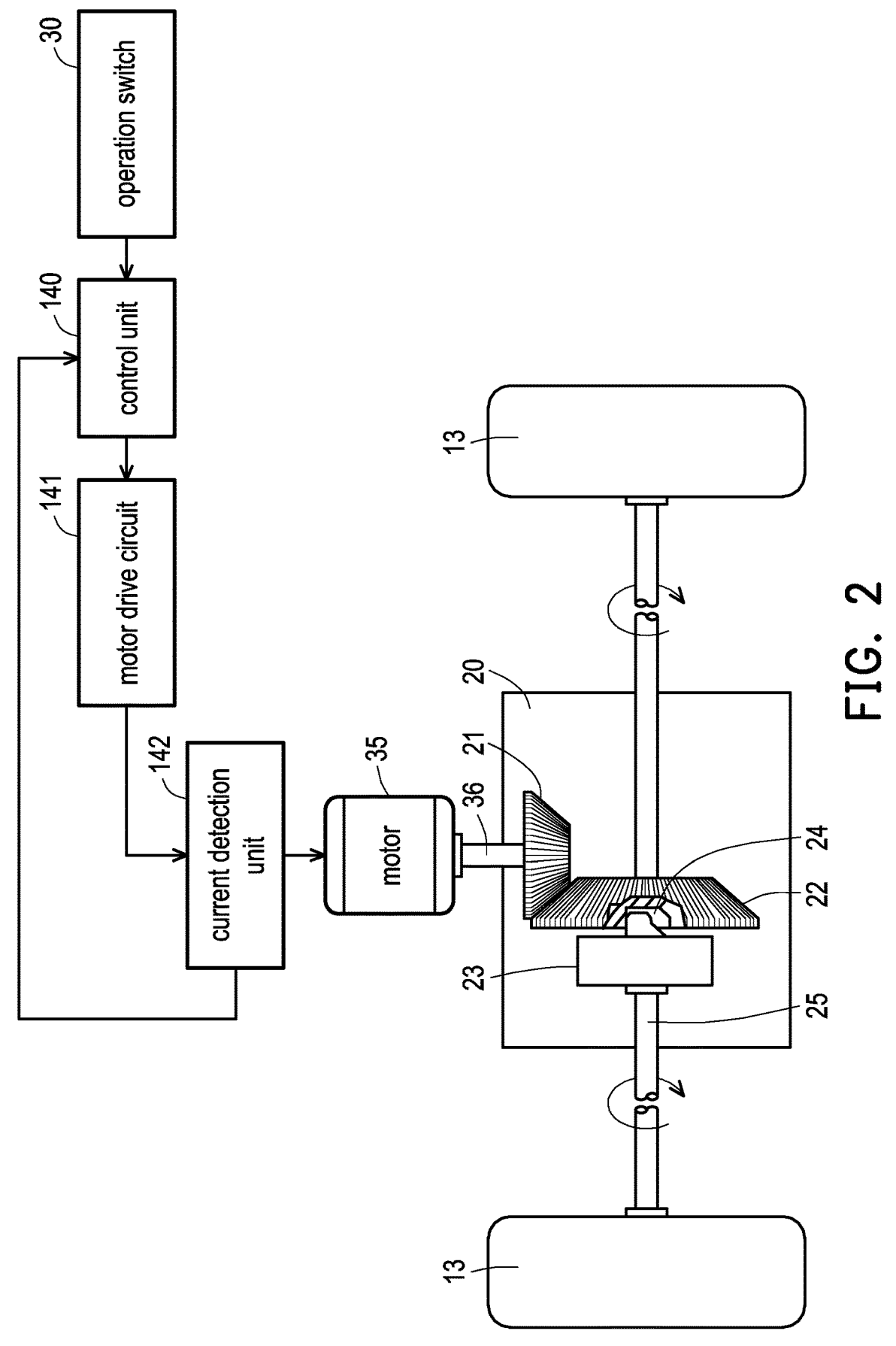
FIG. 2 is a diagram illustrating a main part of the power transmission system of the electric power equipment including a block diagram representing the control system for the drive source.

FIG. 2 is a diagram illustrating a main part of the power transmission system of the electric power equipment including a block diagram representing the control system for the drive source. As shown in FIG. 2, the overall structure of the power transmission system 20 including the control system for the electric motor 35 is represented by a block diagram. The power transmission system 20 includes a drive bevel gear 21 fixedly attached to a drive shaft 36 of the electric motor 35, an axle shaft 25 extending laterally and rotatably supported by the body frame 11, a driven bevel gear 22 rotatably supported by the axle shaft 25 and meshing with the drive bevel gear 21. The driven bevel gear 22 has a greater diameter than the drive bevel gear 21. The rear wheels 13 are fixedly attached to either end of the axle shaft 25. The power transmission system 20 further includes a clutch 23 and a clutch actuating mechanism 24 interposed between the driven bevel gear 22 and the axle shaft 25, wherein the clutch 23 is a one-way clutch, for example. The clutch 23 is configured to be engaged or disengaged with the electric motor 35 by the clutch actuating mechanism 24.

As shown in FIG. 2, the control system for the electric motor 35 includes a controller 140 (a control unit 140), a motor drive circuit 141 and a current detection unit 142, wherein the current detection unit 142 includes a load detector that detects a load of the electric motor by detecting an electric current of the electric motor 35. Control of the drive source (the electric motor) according to this embodiment is explained with reference to FIG. 3 to FIG. 6 in the following.

<Control of an Operation of the Drive Source>

According to an exemplary embodiment of the disclosure, as shown in FIG. 2, the clutch 23 is provided in the power transmission path between the electric motor 35 and the rear wheels 13 for switching between the transmission and the discontinuation of a power transmission from the electric motor 35 to the rear wheels 13 via the clutch actuating mechanism 24. The clutch 23 is turned on when a rotational speed of the power transmission path between the electric motor 35 and the rear wheels 13 reaches a clutch connection rotational speed.

The controller 140 is configured that in a process of increasing a speed in accordance with a rotational speed command value, when a rotational speed of the electric motor 35 reaches the clutch connection rotational speed, the increasing of the speed in accordance with the rotational speed command value is interrupted, and when the rotational speed of the electric motor 35 reaches a predetermined rotational speed, the increasing of the speed in accordance with the rotational speed command value is performed.

With respect to the traveling control of the electric equipment 10, when the operator is going to speed up the mower 10, then the controller 140 receives a rotational speed command value, the mower 10 is in a process of increasing a speed in accordance with the rotational speed command value, so as to perform speed adjustment functions in response to the sudden acceleration or the sudden deceleration command value. In the exemplary embodiment of the disclosure, the controller 140 is configured that in the process of increasing the speed in accordance with the rotational speed command value, the increasing of the speed in accordance with the rotational speed command value is interrupted, when the rotational speed of the electric motor 35 reaches the clutch connection rotational speed. And when the rotational speed of the electric motor 35 reaches a predetermined rotational speed, the increasing of the speed in accordance with the rotational speed command value is performed. In other words, even though the control system receives a rotational speed command value due to the operation of the operator, if the control system is in a condition when the rotational speed of the electric motor 35 reaches the clutch connection rotational speed, the electric motor 35 is controlled not to speed up as commanded, and the electric motor 35 is controlled that the rotational speed of the electric motor 35 reaches the predetermined rotational speed, then the increasing of the speed in accordance with the rotational speed command value is performed.

In such control of the mower 10, after the clutch is engaged and the controller 140 receives a rotational speed command value as the operator operates, the electric motor 35 is controlled to increase the rotational speed of the electric motor 35 until it reaches the predetermined rotational speed, for example a minimum rotational speed at which the clutch 23 is engaged, regardless of the rotational speed command value. At the start of the driving of the electric motor 35, the unintentional sudden acceleration after the clutch 23 is engaged is suppressed, and the operator does not feel any uncomfortable of the operating of the mower 10, thereby the operability of the electric power equipment 10 is improved. Furthermore, in a case that the engine 14 is installed an alternator (namely, the alternator for converting the power of the engine 14 into an electric power that is supplied to the electric motor 35 as described above), by suppressing the unintentional sudden acceleration occurred after the clutch 23 is engaged, the sudden increase in power consumption of the electric motor 35 at that moment may also be suppressed. Accordingly, it is possible to improve the alternator to be able to work effectively even the alternator is with a comparatively slower instantaneous load response. Therefore, for the electric power equipment 10 equipped with an alternator having a slow instantaneous load response and an electric motor, in despite of the slow instantaneous load response of the alternator, since the unintentional sudden acceleration of the electric motor may be suppressed, it is possible that the alternator may work effectively even with a slow load response, thereby the operability of the mower 10 is improved.

Accordingly, increasing of a deviation value between the value of the rotational speed of the motor and the value of the command value may be prevented. A sudden acceleration due to the deviation value in the rotational speed of the electric motor 35 and the wheel speed when the clutch 23 is engaged may be suppressed. Thereby, slip prevention and lifting prevention may be possible by preventing the sudden acceleration of the mower 10.

As such, the shortcomings due to such sudden acceleration that the travel motor accelerates rapidly so as to comply with the command value may be avoided, and thus, according to the controller 140 of the mower 10, the lawn mower may be operated in a comfortable manner such as the operability of the lawn mower is significantly improved, the front wheels of the lawn mower may not float due to the sudden acceleration, and the like.

Figure 3:
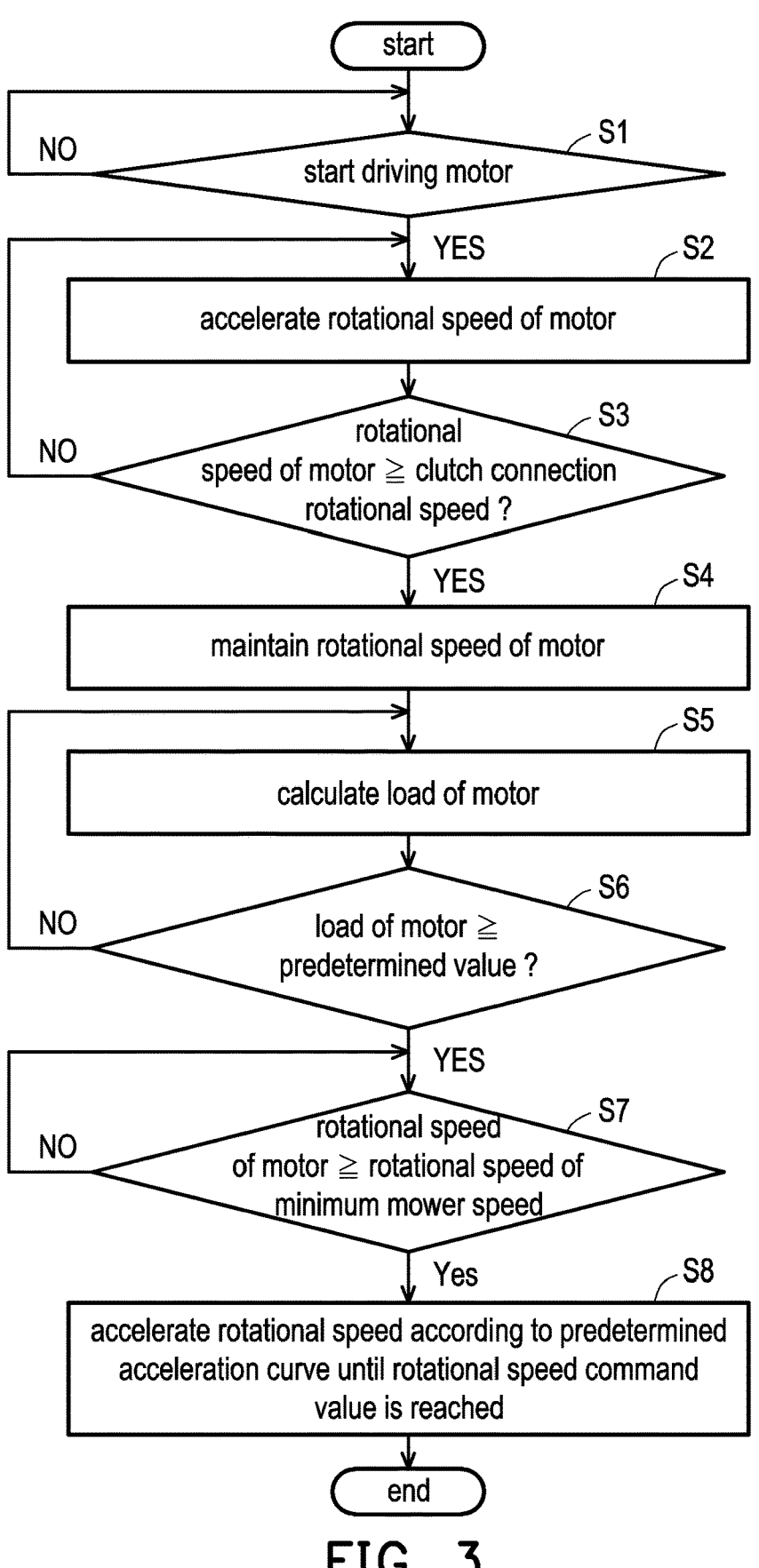
FIG. 3 is a flow chart showing a control process performed by the controller of FIG. 2 according to an exemplary embodiment of the disclosure.
Figure 4:
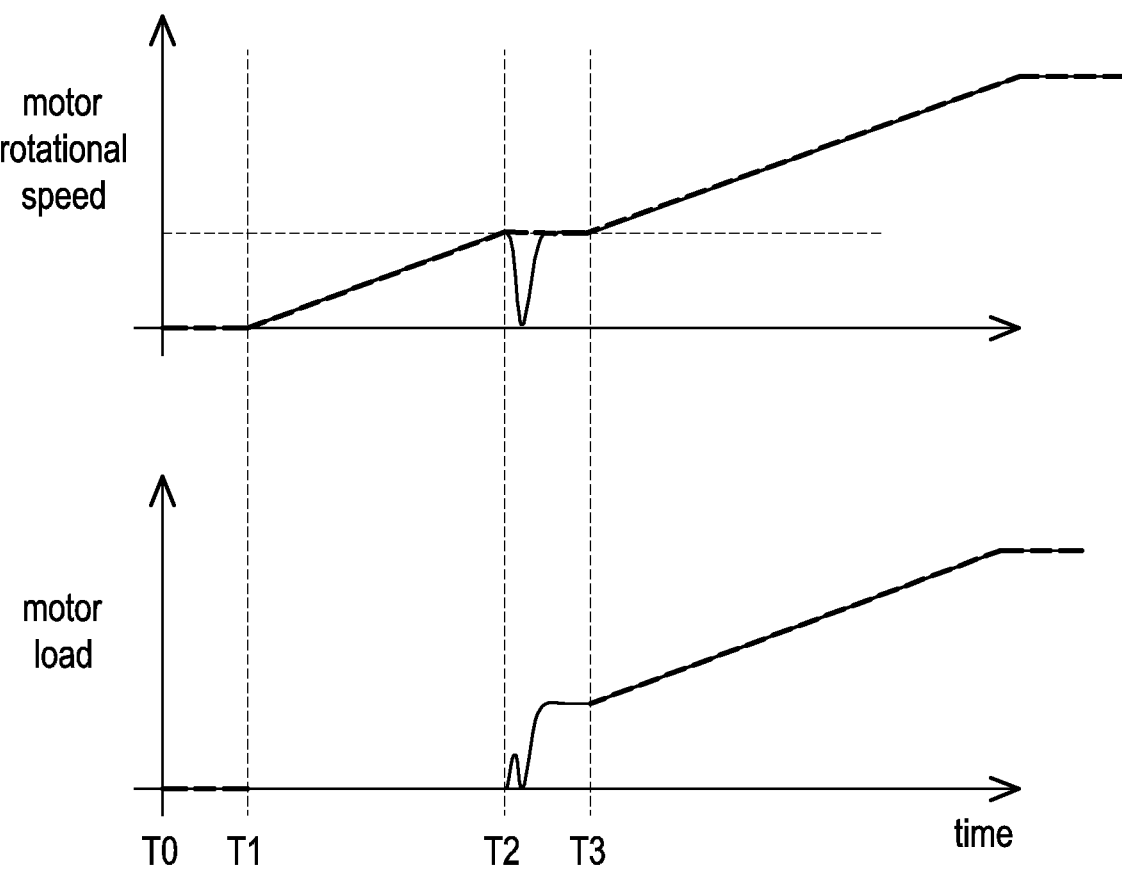
FIG. 4 is a time chart of the rotational speed and the load of the motor when the clutch is engaged in accordance with the control process of FIG. 3.

FIG. 3 is a flow chart showing a control process performed by the controller of FIG. 2 according to an exemplary embodiment of the disclosure. FIG. 4 is a time chart of the rotational speed and the load of the motor when the clutch is engaged in accordance with the control process of FIG. 3.

Referring to FIG. 3 and FIG. 4, in the motor control of the electric power equipment 10, the controller firstly acquires the driving of the motor (in the step S1: start driving motor), and if the controller does not acquire the driving of the motor, then the following steps are not performed. Then in the step S2, after the motor is started to be driven, the motor is accelerated (in the step S2: accelerate rotational speed of motor). In the step S3, after the motor is accelerated in the step S2, the controller determines that whether the rotational speed of the motor is equal to or greater than the clutch connection rotational speed (in the step S3: rotational speed of motor clutch connection rotational speed?). In the step S3, if the rotational speed of the motor does not reach the clutch connection rotational speed yet, then it is returned to the step S2. In the step S3, if the rotational speed of the motor is equal to or greater than the clutch connection rotational speed, then it is proceeded to the step S4, in the step S4, the rotational speed of the motor is maintained at the rotation maintenance value until the rotational speed is stabilized for a time period (in the step S4: maintain rotational speed of motor). In the step S5, the controller calculates the load of the motor according to the detected electric current value of the motor (in the step S5: calculate load of motor), then in the step S6 the controller determines that whether the load of the motor is equal to or greater than a predetermined value that is set in advance according to the actual requirement for the motor to be stabilized when the clutch is started to be engaged (in the step S6: load of motor≥predetermined value?). If the load of the motor does not reach the predetermined value, then it is returned to the previous step S5. If the load of the motor is equal to or greater than the predetermined value, then it is proceeded to the step S7. In the step S7, the controller determines that whether the rotational speed of the motor is equal to or greater than the rotational speed of the minimum mower speed (in the step S7: rotational speed of motor rotational speed of minimum mower speed?), herein the minimum mower speed may be the minimum speed of the mower to make the mower move. In the step S7, if the rotational speed of the motor does not reach the rotational speed of the minimum mower speed, then the step S7 is repeated. In the step S7, if the rotational speed of the motor is equal to or greater than the rotational speed of the minimum mower speed, then it is proceeded to the step S8, in the step S8 the motor is accelerated according to the predetermined acceleration curve until the rotational speed command value is reached (in the step S8: accelerate rotational speed according to predetermined acceleration curve until rotational speed command value is reached). Then, the motor may be stably driven after the step S8 with the rotational speed according to the rotational speed command value.

In FIG. 4, regarding the motor rotational speed, the rotational speed of the motor when the clutch is engaged is shown with a time chart, wherein at the time T0 the motor is driven to start, at the time T1 the travel unit starts to travel, then the motor is accelerated until the rotational speed reaches the clutch connection rotational speed at the time T2. When the clutch is engaged, the rotational speed is maintained at the rotation maintenance value until the rotational speed is stabilized during the time T2 to the time T3, then at the time T3 since the rotational speed has been stabilized, the motor is started to be accelerated until the rotational speed reaches the rotational speed command value according to the predetermined acceleration curve. In FIG. 4, regarding the motor load, during the time T0 to the time T2, there is no load since the clutch is not engaged yet, at the time T2 the load is increased as the clutch is started to be engaged and the acceleration after the clutch engagement is started. During the time T2 to the time T3, since the rotational speed is maintained at the rotation maintenance value until the rotational speed is stabilized, the increased load may not vary until the time T3, then at the time T3 when the rotational speed is stabilized, acceleration of the motor according to the predetermined acceleration curve is started until the rotational speed reaches the rotational speed command value.

Figure 5:
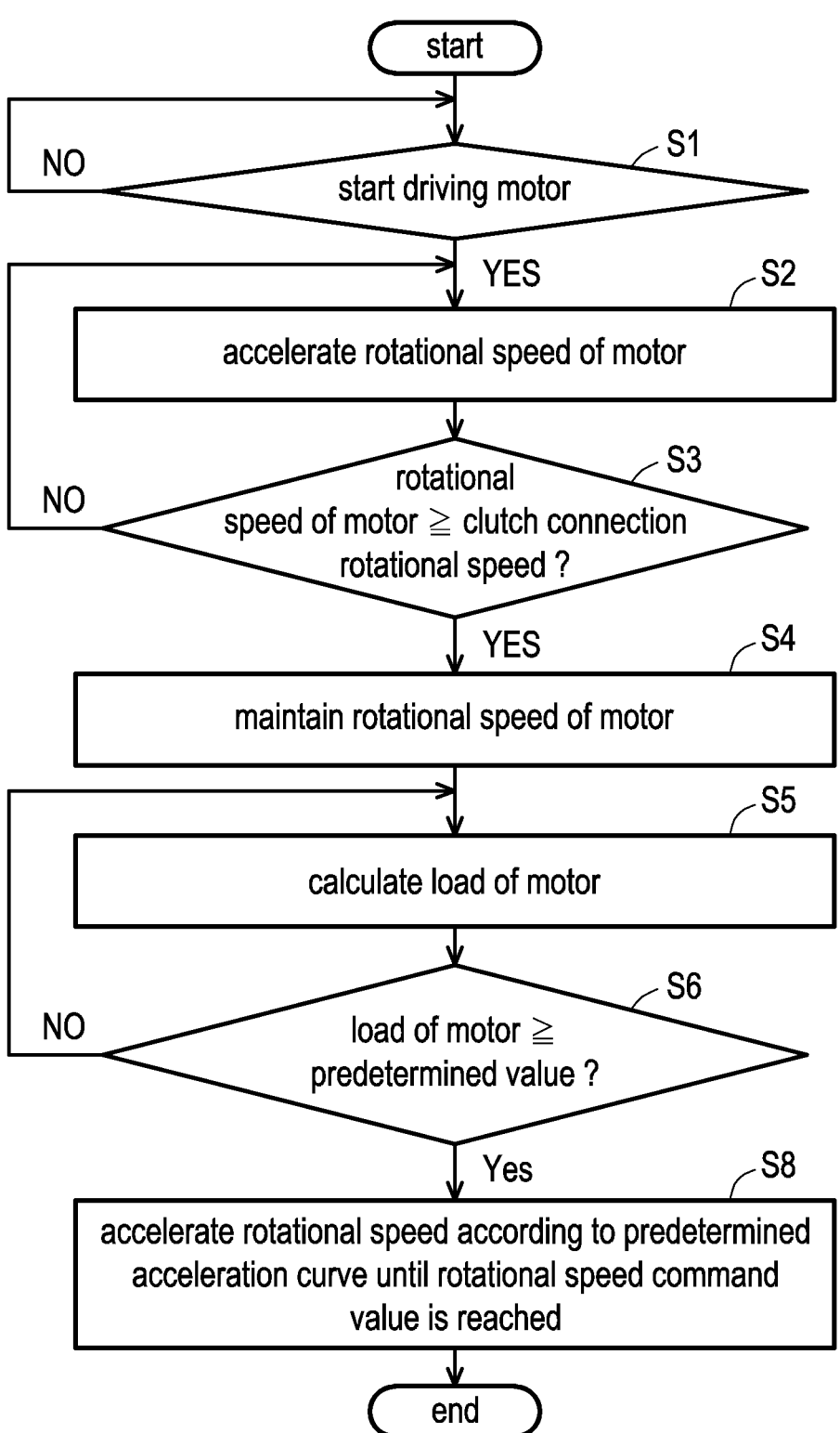
FIG. 5 is a flow chart showing a control process performed by the controller of FIG. 2 according to another exemplary embodiment of the disclosure.
Figure 6:
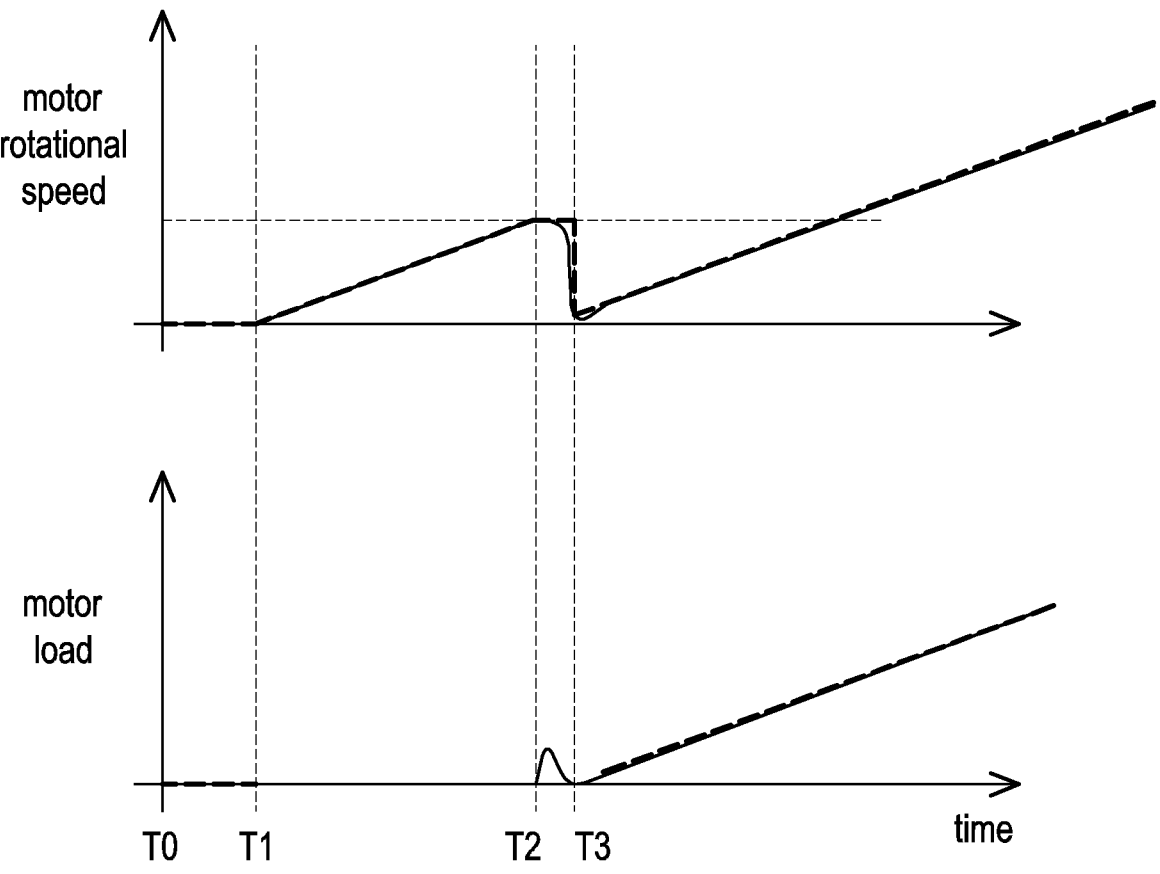
FIG. 6 is a time chart of the rotational speed and the load of the motor when the clutch is engaged in accordance with the control process of FIG. 5.

FIG. 5 is a flow chart showing a control process performed by the controller of FIG. 2 according to another exemplary embodiment of the disclosure. FIG. 6 is a time chart of the rotational speed and the load of the motor when the clutch is engaged in accordance with the control process of FIG. 5.

Referring to FIG. 5 and FIG. 6, in the motor control of the electric power equipment 10, the controller firstly acquires the driving of the motor (in the step S1: start driving motor), and if the controller does not acquire the driving of the motor, then the following steps are not performed. Then in the step S2, after the motor is started to be driven, the motor is accelerated (in the step S2: accelerate rotational speed of motor). In the step S3, after the motor is accelerated in the step S2, the controller determines that whether the rotational speed of the motor is equal to or greater than the clutch connection rotational speed (in the step S3: rotational speed of motor clutch connection rotational speed?). In the step S3, if the rotational speed of the motor does not reach the clutch connection rotational speed yet, then it is returned to the step S2. In the step S3, if the rotational speed of the motor is equal to or greater than the clutch connection rotational speed, then it is proceeded to the step S4, in the step S4, the rotational speed of the motor is maintained at the rotation maintenance value until the rotational speed is stabilized for a time period (in the step S4: maintain rotational speed of motor). In the step S5, the controller calculates the load of the motor according to the detected electric current value of the motor (in the step S5: calculate load of motor), then in the step S6 the controller determines that whether the load of the motor is equal to or greater than a predetermined value that is set in advance according to the actual requirement for the motor to be stabilized when the clutch is started to be engaged (in the step S6: load of motor≥predetermined value?). Herein, in this exemplary embodiment of FIG. 5 and FIG. 6, the predetermined value refers to the predetermined rotational speed that is an arbitrary minimum rotational speed equal to or less than the clutch connection rotational speed, so that the changes in acceleration may be suppressed, the operator does not feel any uncomfortable to the operating of the mower, resulting a better operability. In the step S6, if the load of the motor does not reach the predetermined value, then it is returned to the previous step S5. In the step S6, if the load of the motor is equal to or greater than the predetermined value, then it is proceeded to the step S8, in the step S8 the motor is accelerated according to the predetermined acceleration curve until the rotational speed command value is reached (in the step S8: accelerate rotational speed according to predetermined acceleration curve until rotational speed command value is reached).

Then, the motor may be stably driven after the step S8 with the rotational speed according to the rotational speed command value. In this exemplary embodiment of FIG. 5 and FIG. 6, the step 7 of the above-mentioned exemplary embodiment of FIG. 3 and FIG. 4 in which the condition of the rotational speed of the motor being equal to or greater than the rotational speed of minimum mower speed is not performed.

In FIG. 6, regarding the motor rotational speed, the rotational speed of the motor when the clutch is engaged is shown with a time chart, wherein at the time T0 the motor is driven to start, at the time T1 the travel unit starts to travel, then the motor is accelerated until the rotational speed reaches the clutch connection rotational speed at the time T2. When the clutch is engaged, the rotational speed is maintained at the rotation maintenance value until the rotational speed is stabilized during the time T2 to the time T3, then at the time T3 since the rotational speed has been stabilized, the motor is started to be accelerated until the rotational speed reaches the rotational speed command value according to the predetermined acceleration curve. In FIG. 6, regarding the motor load, during the time T0 to the time T2, there is no load since the clutch is not engaged yet, at the time T2 the load is increased as the clutch is started to be engaged and the acceleration after the clutch engagement is started. During the time T2 to the time T3, since the rotational speed is maintained at the rotation maintenance value (that is the arbitrary minimum rotational speed) until the rotational speed is stabilized, the increased load may not vary until the time T3, then at the time T3 when the rotational speed is stabilized, acceleration of the motor according to the predetermined acceleration curve is started until the rotational speed reaches the rotational speed command value.

As illustrated in the embodiment of the disclosure, the controller is configured that in the process of increasing of the speed in accordance with the rotational speed command value, when the rotational speed of the drive source reaches the clutch connection rotational speed, the speed in accordance with the rotational speed command value is maintained at a rotation maintenance value. As such, the clutch is prevented from disengaging from the motor due to a decrease in rotational speed, such as the decrease in torque input from the motor.

As illustrated in the embodiment of the disclosure, the controller is configured that in the process of increasing of the speed in accordance with the rotational speed command value, the predetermined rotational speed is the clutch connection rotational speed. As such, since the actual acceleration (the speed up of the motor) is controlled to be after the rotational speed is stabilized, the operator does not feel any uncomfortable to the operating of the mower.

As illustrated in the embodiment of the disclosure, the controller is configured that in the process of increasing the speed in accordance with the rotational speed command value, the predetermined rotational speed is an arbitrary minimum rotational speed equal to or less than the clutch connection rotational speed, and when the rotational speed of the drive source reaches the arbitrary minimum rotational speed, the speed in accordance with the rotational speed command value is increased from the arbitrary minimum rotational speed according to a predetermined acceleration curve. As such, since the actual acceleration (the speed up of the motor) is controlled to be after the rotational speed is stabilized and the changes in acceleration may be suppressed, the operator does not feel any uncomfortable to the operating of the mower, resulting a better operability.

As illustrated in the embodiment of the disclosure, the electric power equipment further includes a load detector for detecting a load of the drive source, wherein the controller is configured that after the increasing of the speed in accordance with the rotational speed command value is interrupted and when the load is equal to or larger than a predetermined load value, the speed in accordance with the rotational speed command value is increased. As such, the sudden acceleration when the clutch is disengaged may be prevented.

As illustrated in the embodiment of the disclosure, the electric power equipment is a lawn mower. As such, the effect that a sudden acceleration due to the deviation value in the rotational speed of the motor and the wheel speed when the clutch is engaged may be suppressed and slip prevention and lifting prevention may be possible by preventing the sudden acceleration is more effective, because lawn mowers may be usually used on a slope.

As illustrated in the embodiment of the disclosure, the drive source is a motor, and the load detector detects the load by detecting an electric current value of the motor. As such, the whole structure of the electric power equipment may be designed simpler and more compact.

In light of the foregoing, as illustrated in the embodiment of the disclosure, the electric equipment is equipped with a travel unit, a motor, a clutch and a controller. After the clutch is engaged and the controller receives a rotational speed command value as the operator operates, the motor is controlled to increase the rotational speed of the motor to a minimum rotational speed at which the clutch is engaged, regardless of the rotational speed command value. At the same time, the clutch connection state is determined from the electric current of the motor. When the clutch is engaged, the rotational speed of the motor is controlled to maintain the rotational speed command value at the minimum rotational speed (the minimum clutch connection speed), when the rotational speed of the motor matches the minimum clutch connection speed, then the motor is controlled to accelerate according to the rotational speed command value. When the clutch is not engaged, the minimum clutch connection speed is maintained regardless of the rotational speed command value, until the clutch is engaged. In such configuration of the controller, at the start of the driving of the motor, the unintentional sudden acceleration after the clutch is engaged is suppressed, and the operator does not feel any uncomfortable of the operating of the mower, thereby the operability of the electric power equipment is improved. Accordingly, increasing of a deviation value between the value of the rotational speed of the motor and the value of the command value may be prevented. A sudden acceleration due to the deviation value in the rotational speed of the motor and the wheel speed when the clutch is engaged may be suppressed. Thereby, slip prevention and lifting prevention may be possible by preventing the sudden acceleration of the mower.

The embodiment and example of the disclosure are described above; however, the disclosure is not limited to the above-described embodiment and can be variously modified and altered within the scope of the gist of the disclosure. The embodiment and the modifications thereof are included in the scope and the gist of the disclosure and are included in the disclosure described in the claims and equivalent scopes thereof.

What is claimed is:

1. An electric power equipment, comprising:
a work unit for performing a prescribed work;

a travel unit for enabling the electric power equipment to travel on a ground surface;

a drive source for driving the travel unit;

a clutch provided in a power transmission path between the drive source and the travel unit for switching between a transmission and a discontinuation of a power transmission from the drive source to the travel unit, wherein the clutch is configured that the clutch is turned on when a rotational speed of the power transmission path between the drive source and the travel unit reaches a clutch connection rotational speed of the clutch; and a controller for controlling an operation of the drive source;

wherein the controller is configured such that in a process of increasing a speed in accordance with a rotational speed command value, when a rotational speed of the drive source reaches the clutch connection rotational speed, the increasing of the speed in accordance with the rotational speed command value is interrupted, wherein the rotational speed command value is held substantially constant, and when the rotational speed of the drive source reaches a predetermined rotational speed, the increasing of the speed in accordance with the rotational speed command value is performed, wherein the controller is configured such that in the process of increasing the speed in accordance with the rotational speed command value, the predetermined rotational speed is an arbitrary minimum rotational speed equal to or less than the clutch connection rotational speed, and when the rotational speed of the drive source reaches the arbitrary minimum rotational speed, the speed in accordance with the rotational speed command value is increased from the arbitrary minimum rotational speed according to a predetermined acceleration curve.

2. The electric power equipment according to claim 1, wherein the predetermined rotational speed is the clutch connection rotational speed.

3. The electric power equipment according to claim 1, wherein the electric power equipment is a lawn mower.

4. An electric power equipment, comprising:
a work unit for performing a prescribed work;

a travel unit for enabling the electric power equipment to travel on a ground surface;

a drive source for driving the travel unit;

a clutch provided in a power transmission path between the drive source and the travel unit for switching between a transmission and a discontinuation of a power transmission from the drive source to the travel unit, wherein the clutch is configured such that the clutch is turned on when a rotational speed of the power transmission path between the drive source and the travel unit reaches a clutch connection rotational speed of the clutch; and a controller for controlling an operation of the drive source;

wherein the controller is configured such that in a process of increasing a speed in accordance with a rotational speed command value, when a rotational speed of the drive source reaches the clutch connection rotational speed, the increasing of the speed in accordance with the rotational speed command value is interrupted, wherein the rotational speed command value is held substantially constant, and when the rotational speed of the drive source reaches a predetermined rotational speed, the increasing of the speed in accordance with the rotational speed command value is performed, wherein the electric power equipment further comprises:

a load detector for detecting a load of the drive source, wherein the controller is configured such that after the increasing of the speed in accordance with the rotational speed command value is interrupted and when the load is equal to or larger than a predetermined load value, the speed in accordance with the rotational speed command value is increased.

5. The electric power equipment according to claim 4, wherein the load detector detects the load by detecting an electric current value of the motor.

* * * * *